(12) United States Patent
Zisimopoulos

(10) Patent No.: US 8,493,935 B2
(45) Date of Patent: Jul. 23, 2013

(54) ACCESS NETWORK DISCOVERY AND SELECTION IN A MULTI-ACCESS TECHNOLOGY CELLULAR COMMUNICATION SYSTEM

(75) Inventor: Haris Zisimopoulos, London (GB)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 12/918,203

(22) PCT Filed: Feb. 16, 2009

(86) PCT No.: PCT/EP2009/051781
§ 371 (c)(1),
(2), (4) Date: Oct. 28, 2010

(87) PCT Pub. No.: WO2009/103678
PCT Pub. Date: Aug. 27, 2009

(65) Prior Publication Data
US 2011/0044253 A1 Feb. 24, 2011

(30) Foreign Application Priority Data

Feb. 18, 2008 (GB) .................................. 0802922.5

(51) Int. Cl.
| H04W 4/00 | (2009.01) |
| H04W 36/00 | (2009.01) |
| H04W 24/00 | (2009.01) |
| H04L 12/28 | (2006.01) |
| H04W 84/04 | (2009.01) |
| H04W 36/12 | (2009.01) |
| H04W 64/00 | (2009.01) |

(52) U.S. Cl.
CPC .......... *H04W 36/0005* (2013.01); *H04W 84/04* (2013.01); *H04W 36/12* (2013.01); *H04W 64/00* (2013.01)
USPC ......... 370/331; 370/254; 455/439; 455/456.1

(58) Field of Classification Search
USPC .. 370/254, 255, 328, 329, 331; 455/436–444, 455/456.1
See application file for complete search history.

(56) References Cited

U.S. PATENT DOCUMENTS

| 2003/0206533 A1 | 11/2003 | Charas |
| 2006/0193295 A1 | 8/2006 | White et al. |

(Continued)

FOREIGN PATENT DOCUMENTS

| CN | 1416657 A | 5/2003 |
| EP | 1 117 266 | 7/2001 |
| EP | 1 830 596 | 9/2007 |
| EP | 1 843 613 | 10/2007 |

(Continued)

OTHER PUBLICATIONS

U.S. Appl. No. 13/016,361, filed Jan. 28, 2011, Zismopoulous, et al.

(Continued)

*Primary Examiner* — Paul H Masur
(74) *Attorney, Agent, or Firm* — Oblon, Spivak, McClelland, Maier & Neustadt, L.L.P.

(57) ABSTRACT

A wireless communication unit (302, 405, 505, 605) is capable of communicating with a plurality of communication networks in a cellular communication system, where the plurality of communication networks employ a respective plurality of radio access technologies. The wireless communication unit (302, 405, 505, 605) comprises a receiver for receiving a message from a network device in the cellular communication system; and signal processing logic, operably coupled to the receiver, for determining from the received message a hierarchical policy of network information that applies to the plurality of radio access technologies.

27 Claims, 7 Drawing Sheets

U.S. PATENT DOCUMENTS

| | | | |
|---|---|---|---|
| 2007/0086359 A1* | 4/2007 | Yaqub | 370/254 |
| 2007/0224988 A1 | 9/2007 | Shaheen | |
| 2009/0170555 A1* | 7/2009 | Olvera-Hernandez et al. | 455/552.1 |
| 2010/0290448 A1* | 11/2010 | Rune | 370/338 |
| 2010/0296415 A1* | 11/2010 | Sachs et al. | 370/254 |
| 2011/0096749 A1* | 4/2011 | Rune | 370/331 |

FOREIGN PATENT DOCUMENTS

| | | |
|---|---|---|
| GB | 2 364 620 | 1/2002 |
| RU | 2 263 399 C2 | 2/2004 |
| RU | 2300839 | 6/2007 |
| WO | WO 01/04766 A1 | 1/2001 |
| WO | WO 01/50795 A1 | 7/2001 |
| WO | WO 03/044970 A2 | 5/2003 |
| WO | 2006 078627 | 7/2006 |
| WO | 2006 114712 | 11/2006 |
| WO | 2007 038281 | 4/2007 |
| WO | 2007 126814 | 11/2007 |

OTHER PUBLICATIONS

U.S. Appl. No. 13/016,397, filed Jan. 28, 2011, Zismopoulous, et al.

Russian Office Action issued Feb. 22, 2012, in Russia Patent Application No. 2010138617, application filed on Feb. 16, 2009, (with English Translation).

International Search Report issued May 27, 2009 in PCT/EP09/051781 filed Feb. 16, 2009.

"Handover With Network Discovery and Selection", Motorola, 3GPP TSG-SA WG2 Meeting #63, S2-081410 HO With NDS.V2, 3$^{rd}$ Generation Partnership Project (3GPP), Total pp. 2, XP 050263788, (Feb. 8, 2008).

"3$^{rd}$ Generation Partnership Project; Technical Specification Group Services and System Aspects; Architecture Enhancements for Non-3GPP Accesses( Release 8)", 3GPP TS 23.402 V8.0.0, pp. 1-131, XP 050282133, (Dec. 13, 2007).

UK Office Action issued Jun. 16, 2008 in GB application No. 080 2922.5.

Combined Chinese Office Action and Search Report issued Oct. 23, 2012, in Chinese Patent Application No. 200980111720.2 with English translation.

"Handover With Network Discovery and Selection", Motorola, 3GPP TSG-SA WG2 Meeting #63, S2-081410, 23.402 CR 0135, (Feb. 8, 2008), 3 pages.

* cited by examiner

ACCESS NETWORK DISCOVERY AND SELECTION IN A MULTI-ACCESS TECHNOLOGY CELLULAR COMMUNICATION SYSTEM

FIELD OF THE INVENTION

The invention relates to apparatus and methods for network discovery and selection in a packet data network communication system, for example a communication system comprising a $3^{rd}$ Generation Partnership Project (3GPP) cellular communication network and a non 3GPP network.

BACKGROUND OF THE INVENTION

In 3GPP systems, such as the General Packet Radio System (GPRS), Evolved Packet System (EPS), the downlink communication endpoint, namely the mobile or handheld wireless communication unit, referred to as user equipment (UE) in 3GPP parlance, may have multiple simultaneous connections to a number of network elements. Such network elements typically comprise gateways (GWs), such as General GPRS Support nodes (GGSNs), packet data network (PDN) GWs, etc. In addition, in latest releases of 3GPP systems, the same core network system is used in order to provide access to non-3GPP radio interfaces, such as mobile WiMAX or Wireless LAN (WLAN)

3GPP System Architecture Evolution (SAE) activity aims to devise a network architecture that will allow the convergence of multiple access technologies into a single Operator's network. This will allow users to benefit from multimode terminals that will provide seamless mobility across a number of access technologies, not necessarily defined by 3GPP, and thereby the user is able to use the most 'appropriate' networks at any particular point in time.

Between 3GPP systems, it is known that the 3GPP base stations, referred to as NodeBs, may be configured to broadcast other system information related to neighbouring wireless communication systems, e.g. information about the cells of the 2nd generation of mobile communications, otherwise referred to as Global System for Mobile communications (GSM) related system information.

Given the differences between technologies and mobility principles in 3GPP and non-3GPP access networks it is feasible to implement the mobility features between 3GPP and non-3GPP networks in a stepwise approach. This may allow, on the one hand, an early market entry of a basic solution and, on the other hand, a later enhancement aiming at co-operative handover decisions and context aware mobility. The latter enables a mobile node to change its point of network attachment in a secure and seamless fashion.

One non-3GPP radio access technology is known as mobile Mobile

WiMAX, as defined in the specifications Mobile WiMAX Forum™ Mobile System Profile Release 1.0 (Revision 1.4.0), May 2, 2007 Mobile WiMAX Forum™ Network Architecture Release 1.0.0, March, 2007. No mechanism is yet proposed to facilitate handover between 3GPP and non-3GPP systems.

However, in the context of 3GPP SAE discussions, the following assumptions have been decided, in order to minimize the impact to existing 3GPP legacy network elements in the radio access network (RAN) and the core network (CN):

(i) Initial release of multimode terminals will be based on a 'dual-radio' UE architecture. This effectively means that the UE will require duplicate circuitry, to facilitate simultaneous transmission and reception for a period of time in two different radio technologies.

(ii) Mechanisms that have traditionally been used by 3GPP, to perform network discovery for intra-3GPP systems, are based on broadcast of system information from radio access network RAN) nodes (such as radio network controller (RNC) and eNodeBs) will not be used in order not to impact the legacy network elements.

(iii) Mechanisms that have traditionally been used by 3GPP in order to perform handover decision for intra-3GPP systems and are based on network control from RAN nodes (such as RNC, eNodeBs) will also not be used in order not to impact the legacy network elements.

Within the 3GPP SAE discussions, there has been mention of using an Access Network Discovery and Selection Function (ANDSF), which is envisaged as being an optional network device that is used to facilitate selection of both radio access technology (RAT) types (e.g. Mobile WiMAX from 3GPP and 3GPP from Mobile WiMAX). In this manner, it is envisaged that ANDSF may accelerate the handover (HO) phases and improve the UE's performance. However, as yet, there has been neither a discussion on how this is to be achieved, nor on how a UE communicates with the ANDSF.

It is also envisaged that the Mobile WiMAX system may be supported by a different Network Operator than the neighbouring 3GPP system. Thus, it is envisaged that network or resource sharing agreements may be configured between Network Operators, where different network settings, network capabilities, operating frequency bands etc. may be employed in different geographical areas.

It is known, however, in the 3GPP standard that any retrieval of policies and/or rules from the ANDSF would require the UE to transition to an 'active' mode of operation. As such, any information retrieval procedure should be used as rarely as possible, to ensure that a comparable performance (e.g. at least in terms of battery life) with 3GPP-only UEs.

As an alternative to using ANDSF, it is envisaged that the UE may be provided as a 'dual-radio' UE having two 'radios' on continuously, i.e. configured with duplicated circuitry to support communications in either of the dissimilar technologies. In this alternative configuration, the UE may be able to perform 3GPP to non-3GPP handover, without use of an ANDSF network device, but with reduced performance and with significant impact in the battery life of the UE.

Thus, a cellular network does not broadcast information that is not provided by the source radio access system, for example it does not broadcast an existence of another target radio access system that may be in a vicinity of the UE. In order to perform handover between different radio technologies the two radios need to be switched 'on' all the time in order to be able to discover the target radio system. This is an inefficient solution, since the radio circuitry in the UE needs to be able to scan all the time and of course, thereby consume significant power.

Alternatively the radio circuitry of the source system needs to be kept more frequently in an 'active' mode, so that it will contact the ANDSF network device more frequently and thereby be able to receive availability and configuration information about the target radio access systems in the area. This will unnecessarily consume radio resources by an UE operating in 'active' mode in the one radio system, as well as increase the UE's power consumption.

The aforementioned issues become more acute given the fact that, at least initially, the non-3GPP radio access systems (e.g. mobile WiMAX) will be used for 'hotspot' coverage providing only limited (but high-speed) coverage in a very few geographical areas. In contrast, existing 3GPP systems traditionally provide wide area coverage. Therefore, this concept of multiple overlapping coverage areas and technologies makes it even more inefficient to have the non-3GPP circuitry in the UE operational all the time, since it is going to be used only when the UE approaches these particular geographical areas.

Consequently, current techniques are suboptimal. Hence, an improved mechanism to address the problem of network discovery over a cellular network would be advantageous.

SUMMARY OF THE INVENTION

Accordingly, the invention seeks to mitigate, alleviate or eliminate one or more of the abovementioned disadvantages singly or in any combination.

According to a first aspect of the invention, there is provided, a wireless communication unit capable of communicating with a plurality of communication networks that are operably coupled to a gateway in a cellular communication system. The plurality of communication networks employ a respective plurality of radio access technologies. The wireless communication unit comprises a receiver for receiving a message from a network device in the cellular communication system; and signal processing logic, operably coupled to the receiver, for determining from the received message a hierarchical policy of network information that applies to the plurality of radio access technologies.

In this manner, embodiments of the invention allow a wireless communication unit to avoid needing to move to an 'active only' mode of operation in order to perform network discovery and selection at a reduced data reception rate. Advantageously, this benefits the battery life of the wireless communication unit as there is no added impact on battery life of the wireless communication unit to perform network discovery and selection in handing over to, say non-3GPP radio access technologies (RATs) in a communication system that supports both 3GPP networks and non-3GPP networks.

The wireless communication unit may also use the existing 3GPP mobile management (MM) concept in order to be assisted in the discovery of the non-3GPP neighbouring cells. Hence, no other location technology, such as global positioning system (GPS) elements, is required in order to indicate the UE's location to the ANDSF network device.

In one optional embodiment of the invention, the network information and policy may comprise a global policy of network information that applies to the plurality of radio access technologies. In this manner, embodiments of the invention support a mechanism for network discovery and selection across a variety of radio access technologies, including 3GPP and non-3GPP networks.

In one optional embodiment of the invention, the wireless communication unit may be attached to a first communication network and the policy and network information may be segmented according to the first communication network's mobility management geographical index, for example a routing area (RA)/tracking area (TA). In this manner, the wireless communication unit does not need to retrieve and store unnecessary system information for geographical areas that it may never visit. Advantageously, the wireless communication unit may only request and stores the necessary system information that is applicable to its vicinity.

In one optional embodiment of the invention, the message comprising a global policy may be received at the wireless communication unit when the wireless communication unit attaches to the first communication network.

In one optional embodiment of the invention, when the wireless communication unit is in an active mode and attached to the first communication network, the signal processing logic may be capable of retrieving a local policy according to the first communication network's mobility management information provided by a network device, for example when in close proximity to a target network based on the hierarchical policy message.

In one optional embodiment of the invention, the local policy may be segmented according to the first communication network's mobility management geographical index, for example its routing area (RA)/tracking area (TA).

In one optional embodiment of the invention, the message comprising the local policy may be received at the wireless communication unit when the wireless communication unit is in an idle mode and moves into a new tracking area of the communication system.

In one optional embodiment of the invention, when the wireless communication unit is attached to a first communication network in idle mode, the local policy may be retrieved following the wireless communication unit moving into an active mode in the first communication network.

In one optional embodiment of the invention, the local policy may be associated with at least one second communication network, such that the mobility management geographical index of the first communication network indicates that the at least one second communication network is a neighbouring network of the first communication network.

In one optional embodiment of the invention, when the wireless communication unit is attached to a first communication network in idle mode, and is moving to active mode, the wireless communication unit may be able to retrieve the local policy information if the mobility management geographical index of the first communication network indicates that the at least one second communication network is a neighbouring network of the first communication network.

In one optional embodiment of the invention, the signal processing logic may be further capable of retrieving the network information and policy that applies to the plurality of radio access technologies using a protocol that is transparent to network elements associated with the plurality of communication networks. The protocol may cause the message to be transparent to network elements associated with the plurality of communication networks as it may be perceived as user plane traffic.

In one optional embodiment of the invention, the wireless communication unit may further comprise a memory element operably coupled to the signal processing logic and arranged to store the hierarchical policy of network information that applies to the plurality of radio access technologies.

In one optional embodiment of the invention, the plurality of communication networks may comprise at least one of: an universal telecommunications radio access network (UTRAN) version of a third generation partnership project (3GPP) system, a GSM-EDGE radio access network (GERAN), a long-term evolution (LTE) version of a 3GPP system and a Mobile WiMAX system.

According to a second aspect of the invention, there is provided a network device for assisting discovery and selection of available networks from a plurality of communication networks that are operably coupled to a gateway in a cellular communication system and employ a respective plurality of radio access technologies. The network device comprises logic for transmitting a message in the cellular communication system to a wireless communication unit; wherein the message comprises a network information and policy that applies to the plurality of radio access technologies in this particular area that the UE is tracked depending on its Mobility Management (MM) status (i.e. 'idle' or 'active').

According to a third aspect of the invention, there is provided a communication system comprising a plurality of communication networks employing a respective plurality of radio access technologies that are operably coupled to a gateway. The communication system comprises at least one wireless communication unit capable of communicating with the plurality of communication networks, and at least one network device for assisting discovery and selection of a communication network from the plurality of communication networks. The network device comprises logic for transmitting a message to the at least one wireless communication unit; wherein the message comprises a hierarchical policy of network information that applies to the plurality of radio access technologies.

According to a fourth aspect of the invention, there is provided a method for assisting discovery and selection of a communication network from a plurality of communication networks by a wireless communication unit capable of communicating with the plurality of communication networks, where the plurality of communication networks are operably coupled to a gateway in a cellular communication system and employ a respective plurality of radio access technologies. The method comprises receiving a message from a network device; and determining from the received message a hierarchical policy of network information that applies to the plurality of radio access.

According to a fifth aspect of the invention, there is provided a method for assisting discovery and selection of a communication network from a plurality of communication networks by a wireless communication unit capable of communicating with the plurality of communication networks, where the plurality of communication networks employ a respective plurality of radio access technologies. The method comprises transmitting a message from a network device to the wireless communication unit wherein the received message comprises a hierarchical policy of network information that applies to the plurality of radio access technologies.

According to a sixth aspect and seventh aspect of the invention, there is provided computer program product comprising program code for implementing the aforementioned methods of the fourth and fifth aspects.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
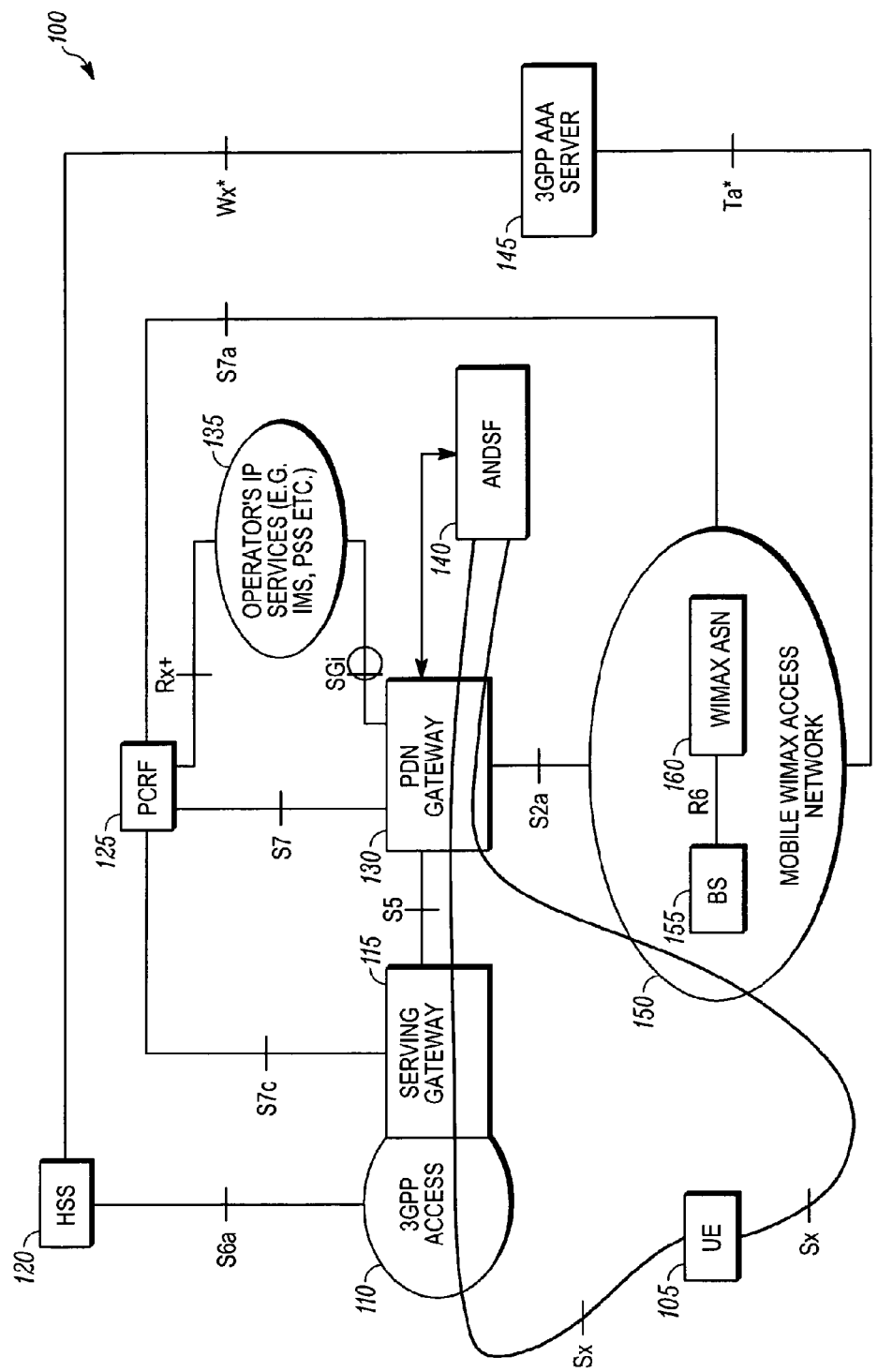
FIG. 1 illustrates an architecture for multiple radio access networks i.e. 3GPP and non-3GPP (as adapted from 3GPP TS 23.402 V8.0.0) in accordance with some embodiments of the invention.

Embodiments of the invention propose a mechanism for network discovery and selection in a system that comprises 3GPP networks (comprising multiple 3GPP cells) and non-3GPP networks (potentially comprising multiple distributed cells that overlap the 3GPP cells). One aspect that impacts the network discovery and selection of non-3GPP access networks by a current 3GPP UE is that the non-3GPP access network may often belong to a different Network Operator. Also, it is envisaged that the specifics of these networks, such as the operating frequency bands, may vary in different geographical areas. This may be either due to roaming in foreign countries, where the non-3GPP networks might be operating in different frequency bands than the UE's home network, or even due to the establishment of network sharing agreements from 3GPP Network Operators with various non-3GPP Network Operators, particularly in large geographical deployments. For example a Network Operator may have an agreement to handover to a first Mobile WiMAX operator in a first geographical area and to a second Mobile WiMAX operator in a second geographical area.

In the context of embodiments of the invention hereindescribed, the term 'hierarchical policy of network information' may be considered as encompassing a segmentation of network policy information per a mobility management (MM) geographical index, which depends on the UE's MM status (for example 'idle' or 'active'). The network device may provide the policy information to the UE, such that it only applies to a particular MM geographical index and applies in the geographical area that the UE is operating. Given that the 3GPP MM applies in a hierarchical manner when the UE switches between an 'idle' and 'active' mode (for example in idle mode the UE is tracked in a much larger geographical area than it is tracked in an 'active' mode), the geographical index that is used at any time to track the UE in this particular area, relative to the UE's MM status (for example 'idle' or 'active'), is also used to segment the policy.

If we consider the timeframe being considered by the 3GPP SAE, it is envisaged that in most deployments 3GPP networks (of any kind) will be used initially to provide 'blanket coverage' whereas the non-3GPP networks will be used for hotspot deployment.

Thus, the inventor has recognized and appreciated that it may be advantageous to provide a network information and policy that applies to the plurality of radio access technologies in the particular area that the UE is tracked, depending on its Mobility Management (MM) status (for example 'idle' or 'active'), thereby allowing an ANDSF network device to 'segment' its policies and/or rules based on a UEs location. In effect, this allows, say, the UE to implement both 'global policies' that will be applicable to the entire network (e.g. for the cases where the two networks belong to the same Network Operator) and also 'local policies' that may be applicable only to certain geographical areas (for example 'hotspots' belonging to a 'local Network Operator').

With this in mind, embodiments of the invention propose to segment information provided by ANDSF into, for example, global policies and local policies, with the local policies implemented on, say, a routing area (RA)/tracking area (TA) basis. Note that although the terms routing area (RA) and tracking area may have slightly different definitions in 3GPP parlance, they are used interchangeably within this document to denote the geographical area where the UE is tracked by the network when in 'idle' mode.

The following description focuses on embodiments of the invention that are applicable to a System Architecture Evolution (SAE) communication system within a $3^{rd}$ generation partnership project (3GPP) system. Furthermore, the following description is also based on localised hotspot Mobile WiMAX systems being located within the coverage area of the 3GPP networks. However, it will be appreciated that the inventive concept is not limited to these particular cellular communication networks, but may be applied to any cellular communication network.

Referring now to FIG. 1, a cellular-based communication system 100 is shown in outline, in accordance with one embodiment of the invention. In this embodiment, the cellular-based communication system 100 is compliant with, and contains network elements capable of operating over, both a Third Generation Partnership Project (3GPP) specification for wide-band code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications), as well as a Mobile WiMAX™ system.

A plurality of wireless subscriber communication units/terminals (or user equipment (UE) in 3GPP nomenclature) 105 communicate over wireless radio links with a plurality of base transceiver stations, referred to under 3GPP terminology as Node-Bs. The system comprises many other UEs and Node-Bs/base stations, which for clarity purposes are not shown.

In accordance with one embodiment of the invention, the architecture comprises a 3GPP access network 110 (comprising one or more eNodeBs, radio network controllers (RNCs), etc.). The 3GPP access network 110 is operably coupled to a serving gateway 115 and a 3GPP Authorisation, Authentication and Accounting (AAA) server 145 via a home subscriber server (HSS) 120. The serving gateway 115 is operably coupled to a packet data network (PDN) gateway 130 and a Policy Charging and Control Function (PCRF) 125. The 3GPP Network Operator's IP services 135, for example Internet Protocol Multimedia Sub-system (IMS), Packet Switched Streaming Service (PSS), etc., are provided to the UE via the PDN gateway 130.

In accordance with embodiments of the invention, an ANDSF network device 140 is operably coupled to the PDN gateway 130.

FIG. 1 also shows a neighbouring Mobile WiMAX™ system 150, whereby the UE 105 is able to access the 3GPP AAA server 145 via a wireless connection to the Mobile WiMAX base station 155, which is operably coupled to a Mobile WiMAX ASN GW 160. The Mobile WiMAX system 150 is operably coupled to the PDN gateway 130, PCRF 125 and 3GPP AAA server 145 of the 3GPP system as shown.

In accordance with one embodiment of the invention, the ANDSF network device 140 has been adapted to employ both global policies and local policies, when providing system information to roaming UEs, as described below. In one embodiment of the invention, the local policies employed by the ANDSF network device 140 are applied on a routing area (RA)/tracking area (TA) basis.

Thus, in embodiments of the invention, a communication network's mobility management geographical index may be referred to as a routing area (RA) or tracking area (TA).

In accordance with one embodiment of the invention, the UE 105 has also been adapted to comprise network selection logic configured to use the respective system information provided by the ANDSF network device 140 according to global or local policies provided to the UE 105.

In accordance with one embodiment of the invention, it is proposed that the functionality of network discovery and selection (ND&S) will be performed by the UE 105, after direct interaction with the Access Network Discovery and Selection Function (ANDSF) network device 140. The ANDSF network device 140 is defined in 3GPP TS 23.402 V8.0.0, which describes the required functionality in the ANDSF network device 140 to assist the UE 105 to the various handover phases for dual-radio UEs.

Figure 2:
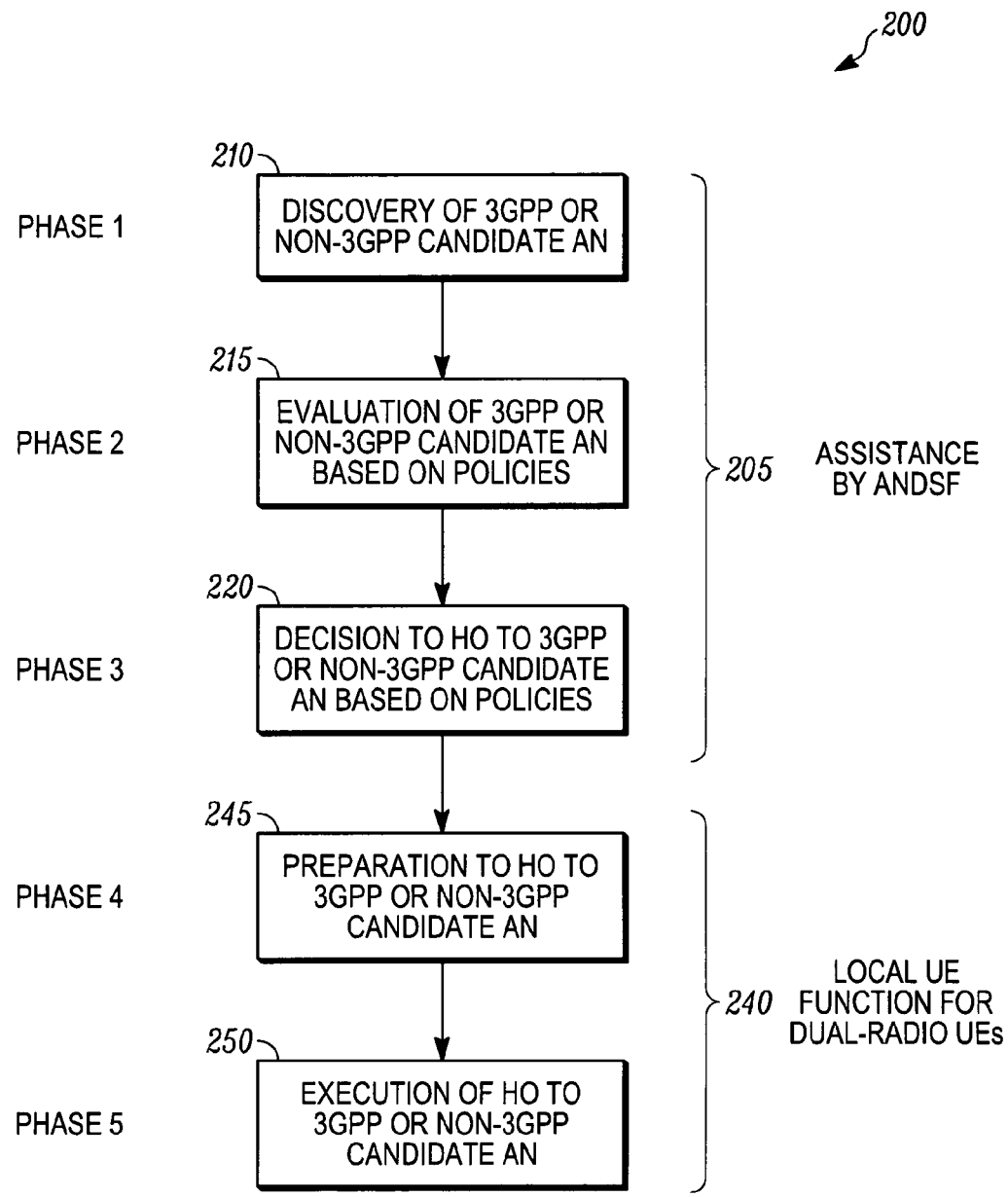
FIG. 2 shows a flowchart illustrating a series of handover phases, in accordance with some embodiments of the invention.

Referring now to FIG. 2, a flowchart illustrates a series of handover phases from 3GPP to/from non-3GPP access networks, in accordance with some embodiments of the invention. Two sets of phases are illustrated: a first set 205 whereby handover is assisted using ANDSF logic, and a second set 240 whereby handover is achieved using local UE functionality, available in dual-radio UEs.

In step 210, in the first set of phases 205, embodiments of the invention propose a mechanism for discovery of a 3GPP or non-3GPP candidate access network (AN). This phase includes a process whereby the UE discovers the existence of a target 3GPP or non-3GPP AN in its location area, dependent upon the handover direction.

To assist the UE in accelerating the execution of this phase in step 210, the ANDSF network device may provide at least some of the following information to the UE:
  (i) A list of available 3GPP/non-3GPP ANs that the UE is allowed to attach to in close proximity;
  (ii) System information, such as frequencies of operation and network capabilities of the available networks, in order to accelerate the scanning process.

The handover phases in FIG. 2 then moves to step 215, whereby an evaluation of a 3GPP or non-3GPP candidate AN is performed based on policies/rules employed at the UE. This phase includes the process whereby the UE evaluates the available AN prior to deciding to handover to a particular network. To assist the UE to accelerate the execution of this phase, it is envisaged that the ANDSF network device may provide the UE with criteria to allow a target AN evaluation to be made.

For example, in one embodiment of the invention, the evaluation may be made based on signal quality information in one case, whereas in another case it may simply be based on an availability of a particular AN that offers a specific Quality of Service (QoS) level (e.g. bandwidth).

The handover phases in FIG. 2 then moves to step 220, whereby a decision is made by the UE as to whether to handover to the 3GPP or non-3GPP candidate AN based on policies/rules employed by the UE. To assist the UE to execute this phase, and additionally allow the Network Operator to control the handover decision, it is envisaged that the ANDSF network device may provide one or more of the following items of information to the UE:
  (i) One or more handover policies/rules to be employed by the UE, for example of the kind 'always HO to a wireless local area network (WLAN)', 'handover to a Mobile WiMAX system only when the received signal strength is higher than 'X' dBs', etc.

(ii) One or more handover decision targets, for example in order to select a handover to a Mobile WiMAX system a received signal strength measurement must be greater than 'X' dBs.

(iii) Operator preferences, for example, handover to a WLAN is always preferred, if such an option is available.

In step 245, in the second set of phases 240, embodiments of the invention propose to enable the UE to prepare to handover to a 3GPP or non-3GPP candidate AN. This phase includes a process whereby the UE and/or the network prepares the target AN in order to 'accept' the UE. The phase 240 also potentially reserves resources that would allow the UE to move to the target AN with the same QoS.

It is noteworthy that in dual-radio UEs this phase is not necessary, since the UE is capable of preparing the network entry by itself, for example in a known 'make-before-make' manner. Hence, this phase does not have any impact on the functionality of the ANDSF network device.

The handover phases in FIG. 2 then moves to step 250, whereby a handover is executed to either the 3GPP or non-3GPP candidate AN. In this phase, the UE switches the link-layer connection to the target AN, and it also potentially triggers an user plane tunnel switch, as would be understood by a skilled artisan.

Figure 3:
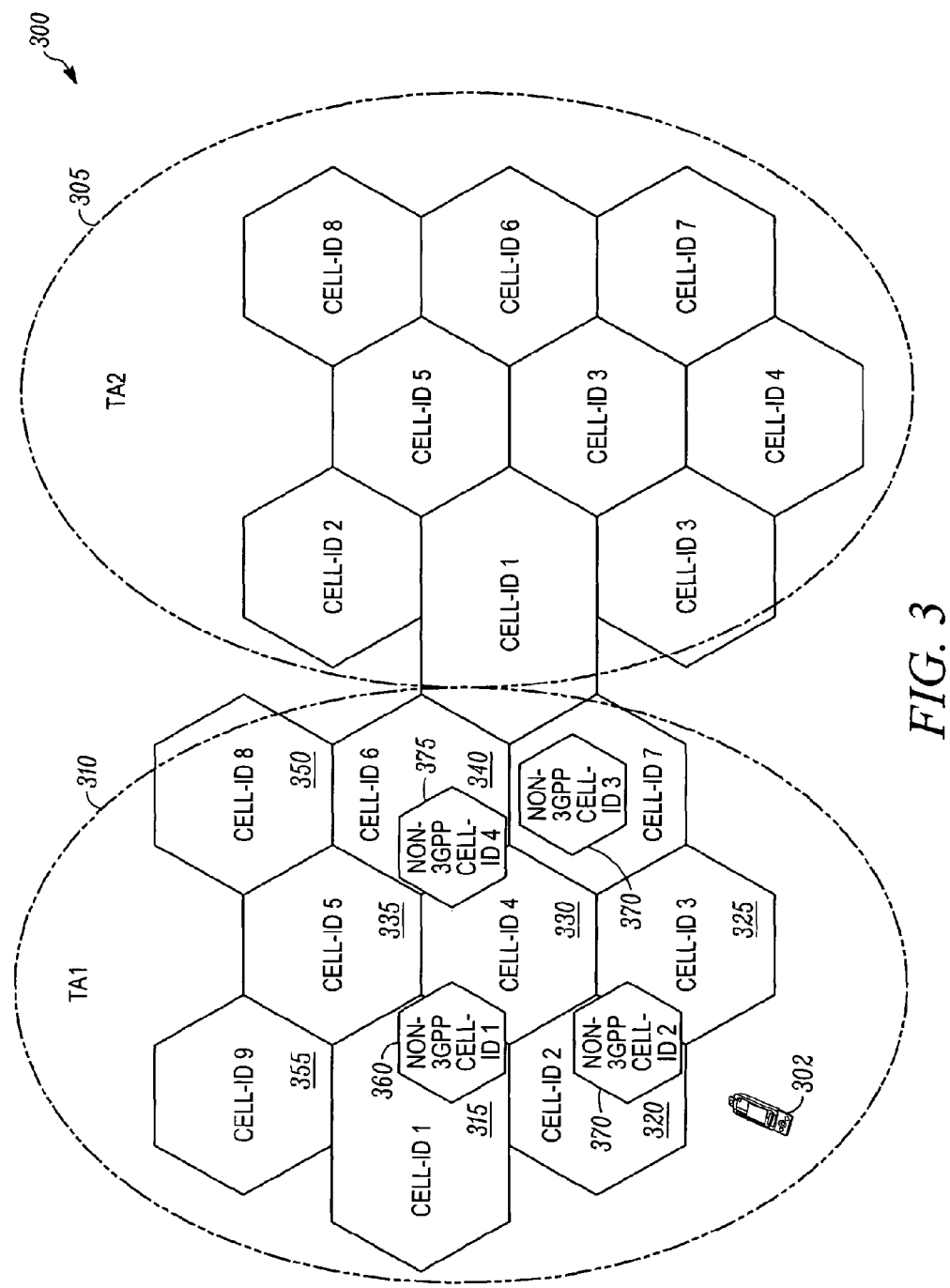
FIG. 3 illustrates a distribution of non-3GPP (e.g. Mobile WiMAX cells) and 3GPP tracking areas adapted in accordance with some embodiments of the invention.

Referring now to FIG. 3, an architecture of an envisaged distribution of non-3GPP networks (e.g. Mobile WiMAX cells) in 3GPP routing areas (RAs)/tracking areas (TAs) is illustrated. For example, at least during initial deployment, it is envisaged that Mobile WiMAX networks may be activated irregularly within a 3GPP dominated location area, with the Mobile WiMAX cells targeted to support 'hot-spots' of communications. Thus, FIG. 3 illustrates a number of 3GPP cells 315, 320, 325, 330, 335, 340, 345, 350, 355 in a first tracking area (TA-1) 310, neighbouring a second tracking area (TA-2) 305. Notably, a number of 'hot-spot' Mobile WiMAX cells 360, 365, 370, 375 have been installed, which overlap the coverage area supported by the 3GPP networks.

Therefore, in accordance with embodiments of the invention, a mechanism is provided to enable a UE 302 to 'discover' Mobile WiMAX networks only when the UE 302 is in close proximity to one or more Mobile WiMAX networks, to avoid wasting battery life by requiring use of a 'dual radio'. In accordance with embodiments of the invention, the UE 302 performs Mobility Management (MM) in a similar manner to how the UE 302 performs MM in current 3GPP networks, inasmuch as when the UE 302 moves into a new tracking area (that encompasses (is seen by) a number of cells, both 3GPP and non-3GPP) it is configured to operate in an 'idle mode'. The UE 302 is then able to access a paging signal from each specific cell within its tracking area, in case there is traffic in the downlink and this procedure will move the UE to 'active' mode.

Figure 4:
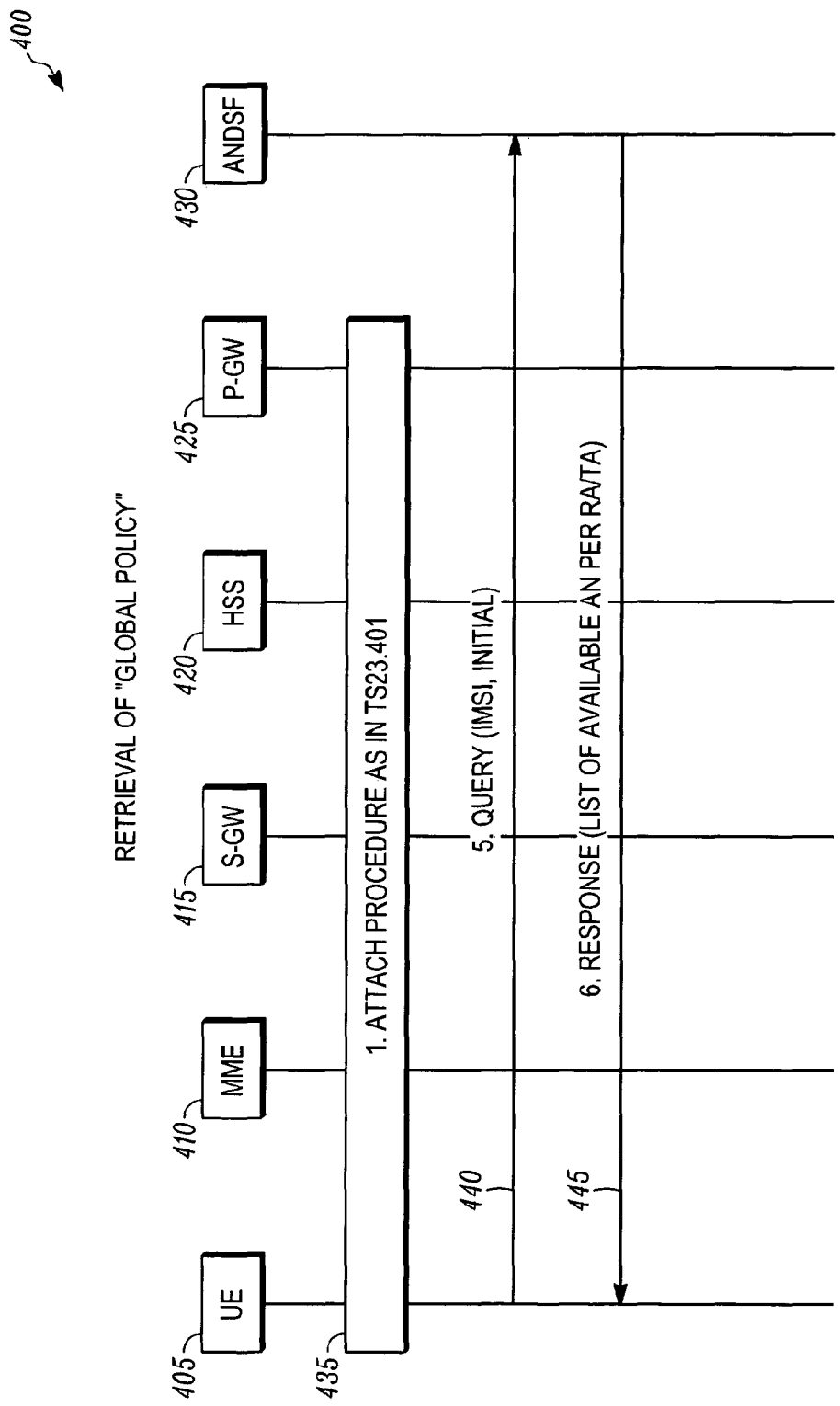
FIG. 4 illustrates a Global policy retrieval procedure in a cellular system, in accordance with some embodiments of the invention.

In accordance with embodiments of the invention, the UE 302 is adapted to store a tracking area reference indicating where one or more Mobile WiMAX networks exist. Thereafter, when a UE 302 moves into such a 'tracking area', the UE 302 is provided with two options:

(i) The UE 302 is able to download all cell information in a form of, say, a mapping neighbour cell list, including 3GPP cells having Mobile WiMAX network as neighbours, to assist in a subsequent potential handover, as illustrated with respect to FIG. 4. For example, referring back to FIG. 3, the UE 302 may have moved into a first tracking area (TA-1) 310 that comprises nine 3GPP cells where only five cells have Mobile WiMAX neighbours. The UE 302 is able to use or discard the mapping neighbour cell list information;

(ii) The UE 302 is able to only download cell info when it is needed, for example, when it transitions into an 'active mode', in either an uplink (UL) or downlink (DL) direction. Then the UE 302 attaches to a 3GPP cell and determines whether one or more neighbouring Mobile WiMAX cells exist, and only if one or more neighbouring Mobile WiMAX cells exist does the UE 302 obtain the system information relating to the/those Mobile WiMAX systems. It is envisaged that the aforementioned concept may be applied in both directions, e.g. also to assist handover from Mobile WiMAX to a 3GPP network.

Notably, the ANDSF network device is configured to only provide system information related to a particular routing area (RA)/tracking area (TA).

Referring now to FIG. 4, a message sequence chart 400 of a Global policy retrieval procedure, within a concept of hierarchical network discovery and selection, as configured in accordance with some embodiments of the invention, is illustrated. The hierarchical network discovery and selection procedure is described with reference to messages being transferred between a UE 405, a mobility management entity 410, a serving gateway 415, a HSS 420, a packet network gateway 425 and ANDSF network device 430.

In a first step 435, upon initial attachment of a UE 405 to the network, the UE 405 retrieves the network's 'global policy/rules' that apply, say, to the entire communication system, for example referred to as public land mobile network (PLMN) (per PLMN identifier). In one embodiment of the invention, for example, the 'global policy/rules may define at least one of the following:

(i) Global conditions for 3GPP networks only apply;
(ii) Global conditions for non-3GPP (e.g. Mobile WiMAX) only apply;
(iii) Global conditions plus Local conditions for 3GPP networks apply;
(iv) Global conditions plus Local conditions for non-3GPP networks (e.g. Mobile WiMAX) apply.

For example, it is envisaged that one condition may be: 'always attach to a 3GPP/Mobile WiMAX network when available' or 'attach to Mobile WiMAX network only when a received signal strength is below 'X' dBs in 3GPP, and higher than 'Y' dBs in a Mobile WiMAX network'.

In one embodiment of the invention, when the retrieved policy defines 'local conditions' (as in (iii) and (iv) above, and shown in the example table 1, below) the UE 405 retrieves the list of routing area (RAs)/tracking areas (TAs) from the ANDSF network device 430, in steps 440, 445, where at least one non-3GPP (e.g. Mobile WiMAX) cell exists. In this embodiment, no further MM switch from 'idle' mode to 'active' mode is required for the UE 405, as the UE 405 is in 'active' mode for a period of time after the initial attach procedure is complete.

TABLE 1

An example of retrieved 3GPP and non-3GPP cell information

| List of 3GPP cell -ids with wimax neigbours in the TA | WiMAX cells System Information and Policy |
|---|---|
| CI1, CI2, C3, CI4 | WiMAX Cell1- System Information1, Policy 1 |

TABLE 1-continued

An example of retrieved 3GPP and non-3GPP cell information

| List of 3GPP cell -ids with wimax neigbours in the TA | WiMAX cells System Information and Policy |
|---|---|
| CI7, CI8, C3, CI12 | WiMAX Cell2- System Information2, Policy 1 |
| ... | |
| CI7, CI8, C3, CI12 | WiMAX Cell55- System Information55, Policy 2 |

Subsequently, after the UE 405 has retrieved the list of RAs/TAs from the ANDSF network device 430, in steps 440, 445, the UE 405 performs 3GPP 'idle' mode MM as normal as defined in 3GPP TS 23.401 V8.0.0. The UE 405 then uses the 3GPP RAs/TAs as a 'primary geographical' index. In this manner, when the UE 405 performs 3GPP 'idle' mode mobility management (for example, UTRAN routing area update (RAU), eUTRAN tracking area update (TAU)), the UE 405 checks the new Routing Area Identity (RAI)/Tracking Area Identity (TAI) against the list obtained in step 445. If the new RAI/TAI does not match the list obtained in step 445 then the UE 405 continues the 3GPP MM procedure as normal.

However, in accordance with embodiments of the invention, if the new RAI/TAI matches an RAI/TAI from the list retrieved from the ANDSF network device 430, the UE 405 may request a list of cell identifiers that have at least one neighbouring Mobile WiMAX cell. In one embodiment of the invention, these cell identifiers may include local conditions/network information elements (e.g. frequency, etc.) as described later. In this embodiment, the UE procedure would follow the steps in the message sequence chart 500 of FIG. 5.

Figure 5:
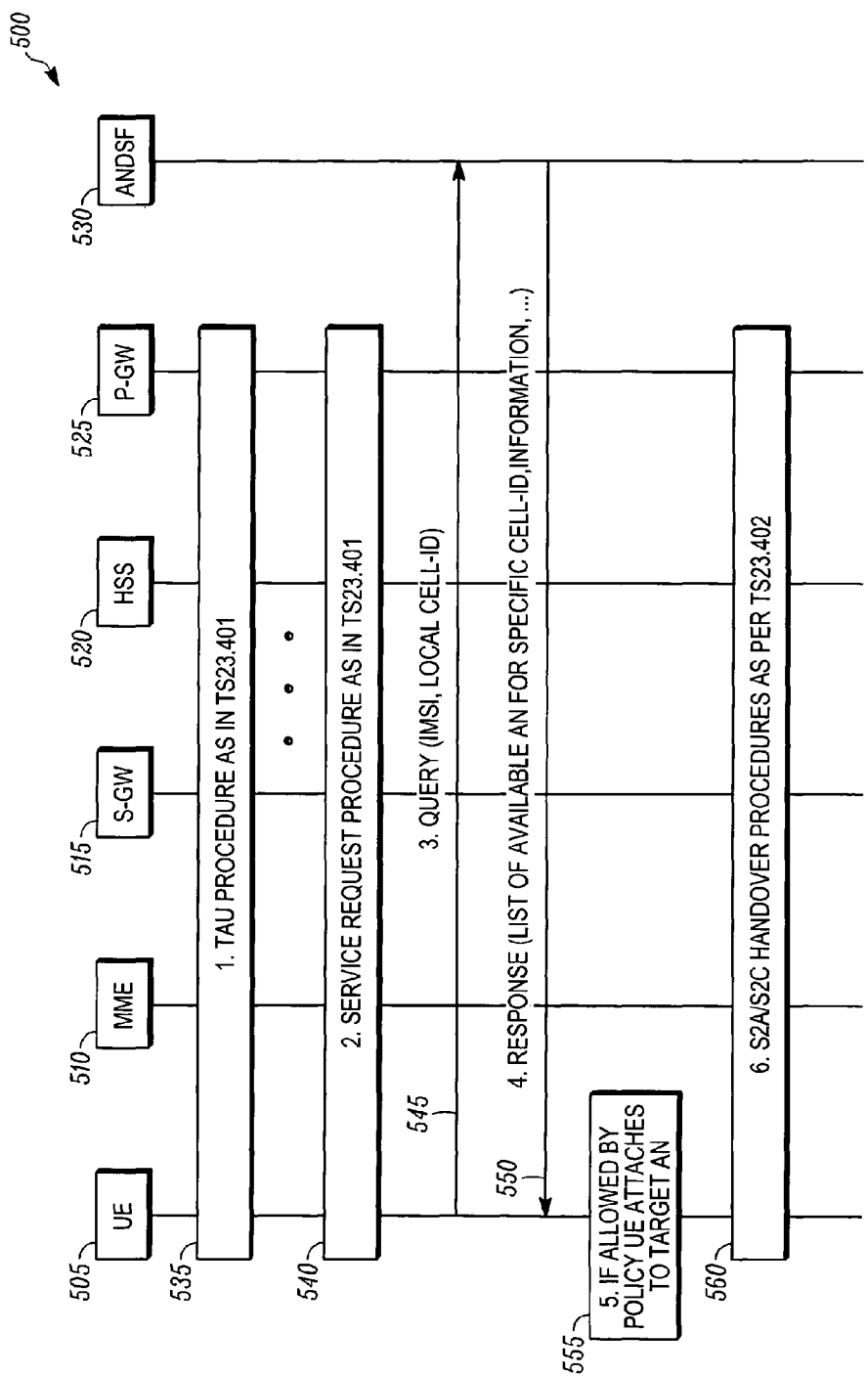
FIG. 5 illustrates a Local policy retrieval procedure using routing area (RA)/tracking area (TA) information, in accordance with some embodiments of the invention.

Referring now to FIG. 5, message sequence chart 500 illustrates a local policy retrieval procedure using routing area (RA)/tracking area (TA) information, within a concept of hierarchical network discovery and selection, in accordance with some embodiments of the invention. Again, the hierarchical network discovery and selection is described with reference to messages being transferred between a UE 505, a mobility management entity 510, a serving gateway 515, a HSS 520, a packet network gateway 525 and ANDSF network device 530.

In accordance with one embodiment of the invention, the local policy retrieval procedure may comprise two options, for example depending upon the foreseeable deployment scenario and the 'density' of the non-3GPP (e.g. Mobile WiMAX) network.

In a first option, when the UE 505 moves into an 'active' mode of operation, for example in response to a normal trigger (such as through a UE initiated service request procedure in step 540 or a network trigger as defined in 3GPP TS 23.401 v8.0.0, for example triggered by uplink (UL) or downlink (DL) traffic respectively in step 535), then the UE 505 checks to see whether the cell ID of the cell it has attached to is contained in the list of cells obtained in step 540, 545. If the Local policy/rules conditions allow, in step 555, the UE 505 executes S2a/S2c handover procedures, as shown in step 560 and defined in 3GPP TR 36.938 v8.0.0.

Figure 6:
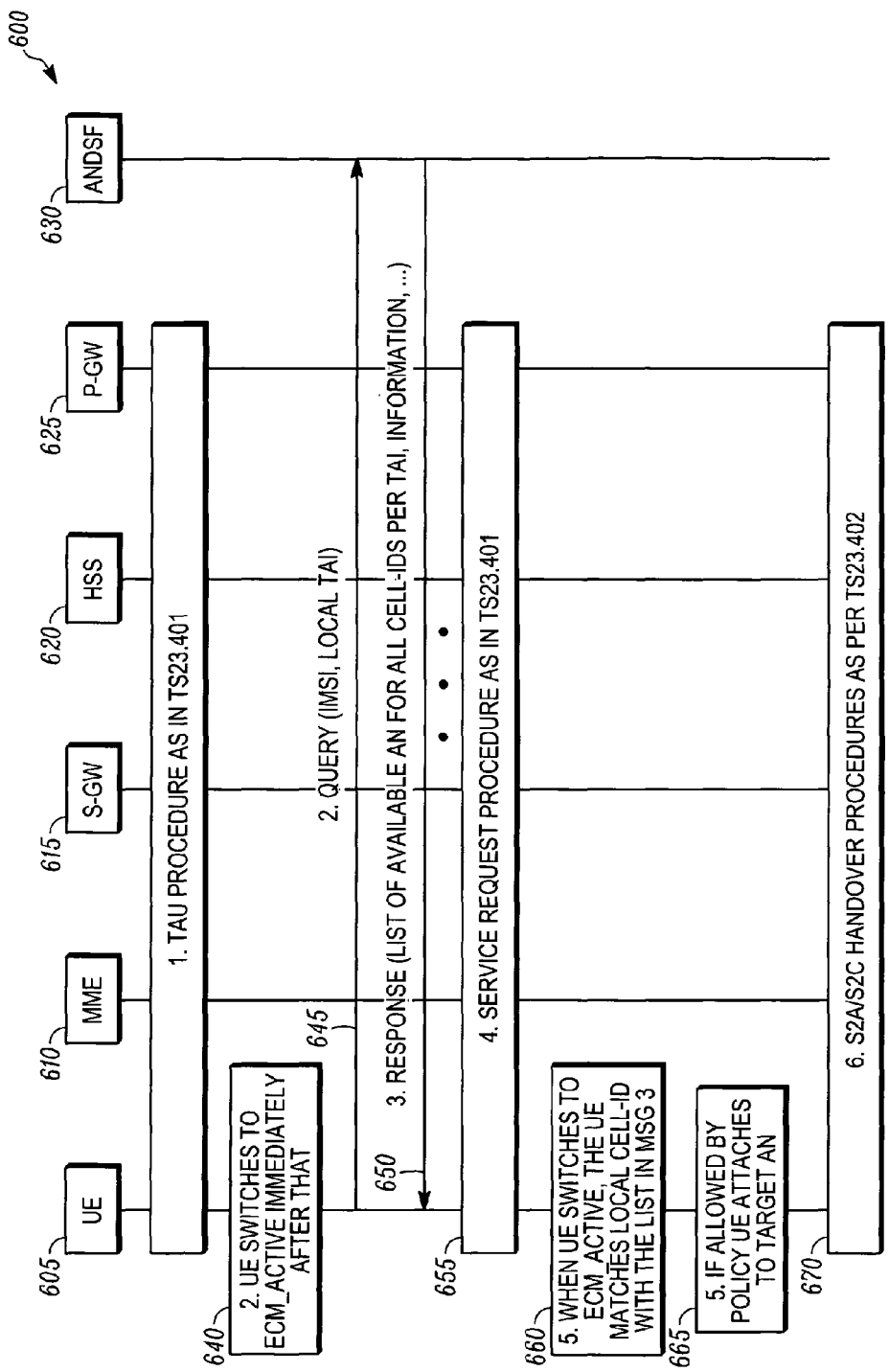
FIG. 6 illustrates a retrieval of 'local policy' information in a particular routing area (RA)/tracking area (TA), in accordance with some embodiments of the invention.

Alternatively, referring now to the messages sequence chart 600 of FIG. 6, when the UE 605 detects that the RAI/TAI matches the list obtained in steps 635 then it moves into active mode, as shown in step 640. Such a movement is made explicitly after the completion of the RAU/TAU (for example, regardless of whether there is UL/DL traffic, which is the normal trigger for a mobility management (MM) switch) and retrieves the 'local policy' for all the cells in the RAI/TAI with one transaction.

It is envisaged that the UE 605 may then locally store the retrieved list. Thus, when/if the UE 605 moves to an active mode (for example ECM_ACTIVE in a case of 3GPP) in step 660, for example following an execution of service request procedure in step 655 and determining that the local cell ID matches the cell ID from the retrieved list, the UE may attach to the target AN (in step 670) by following the local policy, as shown in step 665. If there is no trigger to move to an 'ECM_ACTIVE' mode, the list of all the cell IDs with non-3GPP neighbours will be discarded by the UE 605.

Therefore, in the first option, the UE 505, 605 retrieves the local policies and information that apply to this particular cell ID, only when the UE attaches to the cell (i.e. moves to active mode). In contrast, in the second option the UE 505, 605 retrieves all the information and policies that apply for all the cells in the RA/TA, albeit that the UE 505, 605 may only use them when the UE 505, 605 moves to an 'active' mode through using the normal 3GPP procedures. Hence, the first option provides reduced signalling in a case where the non-3GPP network is, for example in an area where there are only a few non-3GPP cells in the TA. However, the first option does require additional signalling in the handover execution phase. Also, it is noteworthy that the first option does not require the UE 505, 605 to move into an 'active' mode just to retrieve the information from the ANDSF 525, 625. On the other hand, the second option requires the UE 505, 605 to locally store the neighbour cell list per RA/TA, although it may never be used but is locally available when it is needed.

Embodiments of the invention are configured to enable the ANDSF network device to transmit one or more of the following system parameters of Mobile WiMAX neighbouring cells (as defined in ETSI 3GPP TR 36.938 v8.0.0):

(i) Downlink (DL) centre carrier frequency, which shall be a multiple of 250 kHz.
(ii) Cell bandwidth, which identifies a size of a cell's bandwidth.
(iii) Preamble index, which identifies the physical layer (PHY)-specific preamble for the Mobile WiMAX neighbouring base station.
(iv) Base station identifier (ID), which is a global unique identifier for a Mobile WiMAX base station, as defined in the IEEE Std 802.16-2004 and IEEE Std 802.16e-2005 standard. The BS ID represents a logical instance of a physical layer (PHY) and medium access layer (MAC) function, providing 802.16 radio connectivity services to an SS/MS (equivalent to a single frequency sector of a physical base station)
(v) A Network Access Provider (NAP) ID, which is a business entity that provides Mobile WiMAX radio access infrastructure to one or more Mobile WiMAX Network Service Providers (NSPs). A NAP implements this infrastructure using one or more access service networks (ASNs). The NAP ID is contained in the upper 24-bits of a respective BS ID.
(vi) A Network Service Provider (NSP) ID, which identifies a business entity that provides IP connectivity and Mobile WiMAX services to Mobile WiMAX subscribers, compliant with the Service Level Agreement it establishes with Mobile WiMAX subscribers. To provide these services, an NSP establishes contractual agreements with one or more NAPs. Additionally, an NSP may also establish roaming agreements with other NSPs and contractual agreements with third-party application providers (e.g. ASP or ISPs) for providing Mobile WiMAX services to subscribers.

(vii) A MAC layer version, which is an information element that specifies the MAC version of IEEE 802.16 that is supported by BS.
(viii) A System Version, which indicates the Mobile WiMAX release, as specified by the Mobile WiMAX Forum Mobile Air Interface System Profile.
(ix) Available DL Radio Resources, which indicates an average ratio of non-assigned downlink (DL) radio resources to the total usable DL radio resources. The average ratio shall be calculated over a time interval defined by the DL_radio_resources_window_size parameter. The reported average ratio will serve as a relative load indicator.
(x) Available UL Radio Resources, which indicates the average ratio of non-assigned UL radio resources to the total usable UL radio resources. The average ratio shall be calculated over a time interval defined by the UL_radio_resources_window_size parameter. The reported average ratio will serve as a relative load indicator.
(xi) Cell Type, which specifies the cell size for hierarchical cell architecture. A lower value of 'Cell Type' may represent a smaller value for cell size, whereas a higher value of 'Cell Type' may represent larger cell size. Based on a frequency of handovers, a decision may be made to move to a larger cell (in a case of high handover frequency) or to a smaller cell (in a case of low handover frequency).

Although one embodiment of the invention describes a handover mechanism between a 3GPP and a Mobile WiMAX system, it is envisaged that the inventive concept is not restricted to this embodiment. In particular, for example, the inventive handover concept may be applied between any 3GPP network, for example future evolutions of UTRA 3GPP (currently referred to as 'long term evolution' (LTE) and any non-3GPP network.

It is envisaged that the aforementioned inventive concept aims to provide one or more of the following advantages:
(i) The UE does not need to move to an 'active only' mode of operation, in order to perform ND&S (following the procedure of FIG. 5) or in a more reduced data rate (following the procedure of FIG. 6). Advantageously, this benefits the battery life of the UE (as in FIG. 5, there is no added impact in battery life for ND&S of non-3GPP RATs).
(ii) The UE does not need to retrieve and store unnecessary system information for geographical areas that it may never visit. Advantageously, the UE may only request/store the necessary system information that apply in the local area.
(iii) The UE uses the existing 3GPP mobile management (MM) concept in order to be assisted in the discovery of the non-3GPP neighbouring cells. Hence, no other location technology, such as global positioning system (GPS) elements, is required in order to indicate the UE's location to the ANDSF network device.

Figure 7:
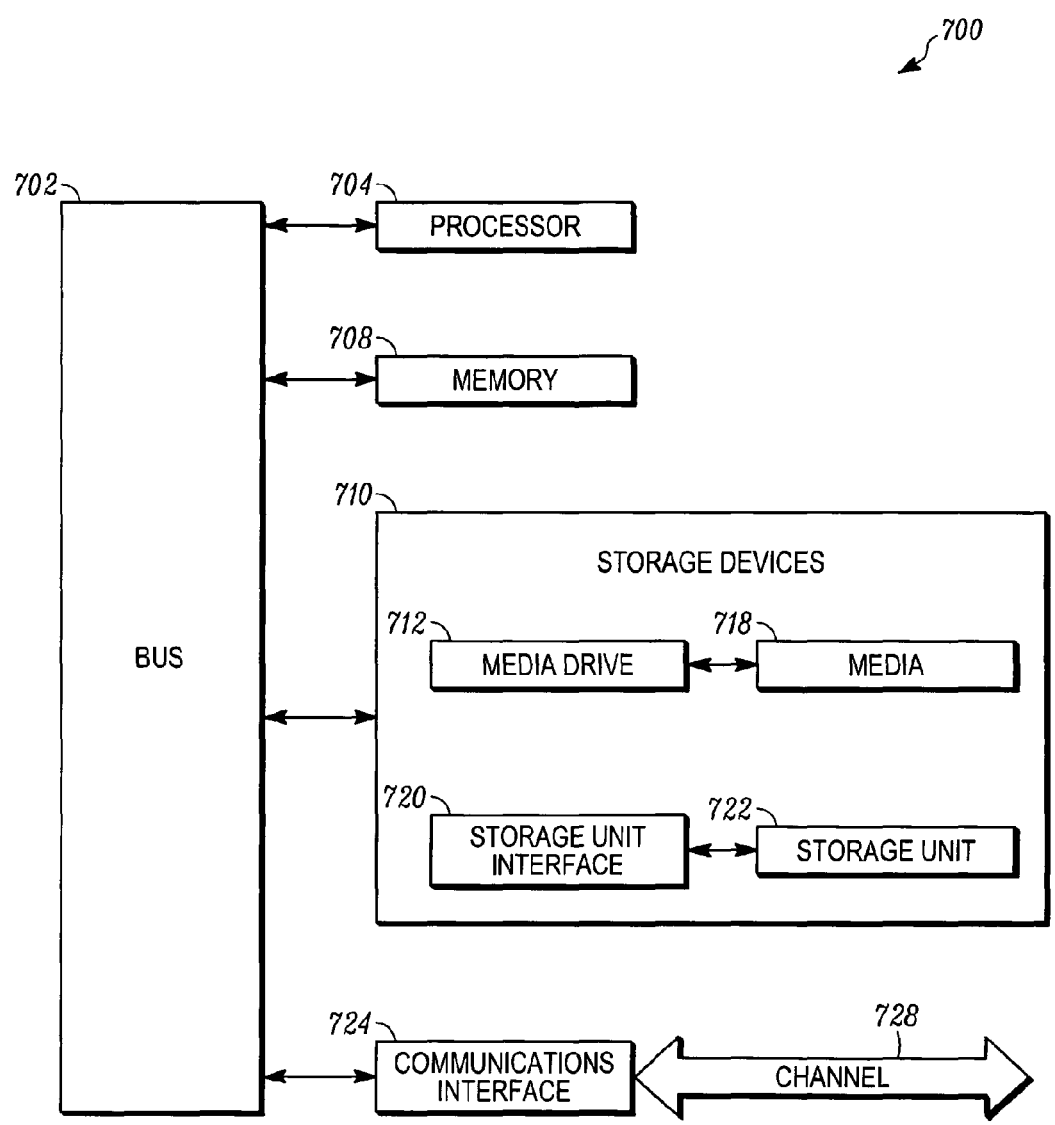
FIG. 7 illustrates a typical computing system that may be employed to implement processing functionality in embodiments of the invention.

FIG. 7 illustrates a typical computing system 700 that may be employed to implement processing functionality in embodiments of the invention. Computing systems of this type may be used in the UE (which may be an integrated device, such as a mobile phone or a USB/PCMCIA modem), or NodeB (in particular, the scheduler of the NodeB), core network elements, such as the GGSN, and RNCs, for example. Those skilled in the relevant art will also recognize how to implement the invention using other computer systems or architectures. Computing system 700 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A wireless communication unit capable of communicating with a plurality of communication networks that are operably coupled to a gateway in a cellular communication system, where the plurality of communication networks employ a respective plurality of radio access technologies, the wireless communication unit comprising:
   a receiver configured to receive a message from a network device in the cellular communication system; and
   circuitry, operably coupled to the receiver, configured to determine from the received message a hierarchical policy of network information that applies to the plurality of radio access technologies, wherein
   the wireless communication unit is attached to a first communication network and the hierarchical policy of network information is segmented according to the first communication network's mobility management geographical index,
   the wireless communication unit is in an active mode when attached to the first communication network, such that the circuitry is configured to retrieve a local policy of network information according to the first communication network's mobility management from the network device, and
   the local policy is associated with at least one second network, such that the mobility management geographical index of the first communication network indicates that the at least one second communication network is a neighboring network of the first communication network.

2. The wireless communication unit of claim 1, wherein the hierarchical policy of network information further comprises a global policy of network information that is associated with the plurality of radio access technologies in the geographical area of the cellular communication system.

3. The wireless communication unit of claim 1, wherein the message comprising a global policy of network information is received at the wireless communication unit when the wireless communication unit attaches to the first communication network.

4. The wireless communication unit of claim 1, wherein the circuitry is further configured to retrieve a local policy of network information related to at least one radio access technology of the plurality of radio access technologies when in close proximity to a geographical location of the second communication network based on the hierarchical policy message.

5. The wireless communication unit of claim 1, wherein the message comprises a local policy of network information received by the wireless communication unit when the wireless communication unit is in an idle mode and moves into a new tracking area of the communication system.

6. The wireless communication unit of claim 1, wherein the wireless communication unit is attached to the first communication network in idle mode such that the local policy is retrieved following the wireless communication unit moving into an active mode in the first communication network.

7. The wireless communication unit of claim 1, wherein the circuitry is further configured to retrieve the hierarchical policy of network information that applies to the plurality of radio access technologies using a protocol that is transparent to at least one network element associated with the plurality of communication networks.

8. The wireless communication unit of claim 7, wherein the protocol causes the message to be transparent to the at least one network element associated with the plurality of communication networks as it is perceived as user plane traffic.

9. The wireless communication unit of claim 1, further comprising:
a memory element operably coupled to the circuitry and arranged to store the hierarchical policy of network information that applies to the plurality of radio access technologies.

10. The wireless communication unit of claim 1, wherein the plurality of communication networks comprise at least one of: an universal telecommunications radio access network (UTRAN) version of a third generation partnership project (3GPP) network, a GSM-EDGE radio access network (GERAN), a long-term evolution (LTE) version of a 3GPP network and a Mobile WiMAX network.

11. A network device for assisting discovery and selection of available networks from a plurality of communication networks that are operably coupled to a gateway in a cellular communication system and employ a respective plurality of radio access technologies, the network device comprising:
circuitry configured to transmit a message in the cellular communication system to a wireless communication unit, wherein
the message comprises a hierarchical policy of network information associated with the plurality of radio access technologies,
the wireless communication unit is attached to a first communication network and the hierarchical policy of network information is segmented according to the first communication network' s mobility management geographical index,
the wireless communication unit is in an active mode when attached to the first communication network and retrieves a local policy of network information according to the first communication network' s mobility management from the network device, and
the local policy is associated with at least one second network, such that the mobility management geographical index of the first communication network indicates that the at least one second communication network is a neighboring network of the first communication network.

12. The network device of claim 11, wherein
the hierarchical policy of network information comprises a global policy of network information that applies to the plurality of radio access technologies.

13. The network device of claim 11, wherein the message comprises a global policy and the circuitry is configured to transmit the message to the wireless communication unit when the wireless communication unit attaches to the first communication network.

14. The network device of claim 11, wherein
the circuitry is configured to transmit the message comprising a global policy to the wireless communication unit when the wireless communication unit is identified as being in an idle mode and having moved into a new tracking area of the communication system.

15. The network device of claim 11, wherein
the circuitry is configured to transmit, to the wireless communication unit, a local policy related to at least one radio access technology of the plurality of radio access technologies based on the hierarchical policy information message.

16. The network device of claim 15, wherein
the local policy is segmented according to the respective communication network's mobility management geographical index.

17. The network device of claim 11, wherein
a protocol used to transmit the message is transparent to network elements associated with the plurality of communication networks.

18. The network device of claim 17, wherein
the protocol causes the message to be transparent to network elements associated with the plurality of communication networks as it is perceived as user plane traffic.

19. The network device of claim 11, wherein
the network device is adapted to support communications in at least one of: an universal telecommunications radio access network (UTRAN) version of a third generation partnership project (3GPP) system, a GSM-EDGE radio access network (GERAN), a long-term evolution (LTE) version of a 3GPP system and a Mobile WiMAX system.

20. The network device of claim 11, wherein
the network device is an Access Network Discovery and Selection Function (ANDSF) network device.

21. A communication system comprising a plurality of communication networks employing a respective plurality of radio access technologies that are operably coupled to a gateway, wherein the communication system comprises:
at least one wireless communication unit capable of communicating with the plurality of communication networks; and
at least one network device configured to assist discovery and selection of a communication network from the plurality of communication networks, wherein
the at least one network device includes circuitry configured to transmit a message to the at least one wireless communication unit, the message comprising a hierarchical policy of network information associated with the plurality of radio access technologies,
the at least one wireless communication unit is attached to a first communication network and the hierarchical policy of network information is segmented according to the first communication network' s mobility management geographical index,
the at least one wireless communication unit is in an active mode when attached to the first communication network and retrieves a local policy of network information according to the first communication network' s mobility management from the network device, and
the local policy is associated with at least one second network, such that the mobility management geographical index of the first communication network indicates that the at least one second communication network is a neighboring network of the first communication network.

22. A method for assisting discovery and selection of a communication network from a plurality of communication networks by a wireless communication unit capable of communicating with the plurality of communication networks, where the plurality of communication networks are operably coupled to a gateway in a cellular communication system and employ a respective plurality of radio access technologies, the method comprising:

receiving a message from a network device; and determining from the received message a hierarchical policy of network information associated with the plurality of radio access technologies, wherein the wireless communication unit is attached to a first communication network and the hierarchical policy of network information is segmented according to the first communication network' s mobility management geographical index, the wireless communication unit is in an active mode when attached to the first communication network and retrieves a local policy of network information according to the first communication network' s mobility management from the network device, and the local policy is associated with at least one second network, such that the mobility management geographical index of the first communication network indicates that the at least one second communication network is a neighboring network of the first communication network.

23. A method for assisting discovery and selection of a communication network from a plurality of communication networks by a wireless communication unit capable of communicating with the plurality of communication networks, where the plurality of communication networks employ a respective plurality of radio access technologies, the method comprising:

transmitting a message from a network device to the wireless communication unit, the message comprising a hierarchical policy of network information associated with the plurality of radio access technologies, wherein the wireless communication unit is attached to a first communication network and the hierarchical policy of network information is segmented according to the first communication network' s mobility management geographical index, the wireless communication unit is in an active mode when attached to the first communication network and retrieves a local policy of network information according to the first communication network' s mobility management from the network device, and the local policy is associated with at least one second network, such that the mobility management geographical index of the first communication network indicates that the at least one second communication network is a neighboring network of the first communication network.

24. A non-transitory computer-readable medium including program code for assisting discovery and selection of a communication network from a plurality of communication networks by a wireless communication unit capable of communicating with the plurality of communication networks, where the plurality of communication networks are operably coupled to a gateway in a cellular communication system and employ a respective plurality of radio access technologies, wherein the computer program product comprises program code for:

receiving a message from a network device; and determining from the received message a hierarchical policy of network information associated with the plurality of radio access, wherein the wireless communication unit is attached to a first communication network and the hierarchical policy of network information is segmented according to the first communication network' s mobility management geographical index, the wireless communication unit is in an active mode when attached to the first communication network and retrieves a local policy of network information according to the first communication network' s mobility management from the network device, and the local policy is associated with at least one second network, such that the mobility management geographical index of the first communication network indicates that the at least one second communication network is a neighboring network of the first communication network.

25. The non-transitory computer-readable medium of claim 24, wherein the non-transitory computer-readable medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

26. A non-transitory computer-readable medium including program code for assisting discovery and selection of a communication network from a plurality of communication networks by a wireless communication unit capable of communicating with the plurality of communication networks, where the plurality of communication networks employ a respective plurality of radio access technologies, wherein the computer program product comprises program code for:

transmitting a message from a network device to the wireless communication unit, the received message comprising a hierarchical policy of network information associated with the plurality of radio access technologies, wherein the wireless communication unit is attached to a first communication network and the hierarchical policy of network information is segmented according to the first communication network' s mobility management geographical index, the wireless communication unit is in an active mode when attached to the first communication network and retrieves a local policy of network information according to the first communication network' s mobility management from the network device, and the local policy is associated with at least one second network, such that the mobility management geographical index of the first communication network indicates that the at least one second communication network is a neighboring network of the first communication network.

27. The non-transitory computer-readable medium of claim 26, wherein the non-transitory computer-readable medium comprises at least one of a hard disk, a CD-ROM, an optical storage device, a magnetic storage device, a ROM (Read Only Memory), a PROM (Programmable Read Only Memory), a EPROM (Erasable Programmable Read Only Memory), a EEPROM (Electrically Erasable Programmable Read Only Memory) and a Flash memory.

* * * * *

UNITED STATES PATENT AND TRADEMARK OFFICE
CERTIFICATE OF CORRECTION

PATENT NO. : 8,493,935 B2  
APPLICATION NO. : 12/918203  
DATED : July 23, 2013  
INVENTOR(S) : Haris Zisimopoulos Page 1 of 1

It is certified that error appears in the above-identified patent and that said Letters Patent is hereby corrected as shown below:

On the title page, Item (86), the PCT Information is incorrect. Item (86) should read:

-- (86) PCT No.:     PCT/EP2009/051781

§ 371 (c)(1),  
       (2), (4) Date:     Nov. 4, 2010 --

Signed and Sealed this  
Fifteenth Day of October, 2013

Teresa Stanek Rea  
*Deputy Director of the United States Patent and Trademark Office*